(12) United States Patent
Bao et al.

(10) Patent No.: US 9,725,557 B2
(45) Date of Patent: Aug. 8, 2017

(54) CONJUGATED POLYMER-BASED APPARATUSES, ARTICLES AND COMPOUNDS

(71) Applicant: The Board of Trustees of the Leland Stanford Junior University, Palo Alto, CA (US)

(72) Inventors: Zhenan Bao, Stanford, CA (US); Lei Fang, College Station, TX (US); Jianguo Mei, Greensboro, NC (US); Yan Zhou, Mountain View, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 14/515,227

(22) Filed: Oct. 15, 2014

(65) Prior Publication Data
US 2015/0105520 A1   Apr. 16, 2015

Related U.S. Application Data

(60) Provisional application No. 61/891,298, filed on Oct. 15, 2013.

(51) Int. Cl.
C08G 61/12   (2006.01)

(52) U.S. Cl.
CPC ......... *C08G 61/126* (2013.01); *C08G 61/124* (2013.01); *C08G 2261/12* (2013.01); *C08G 2261/144* (2013.01); *C08G 2261/148* (2013.01); *C08G 2261/18* (2013.01); *C08G 2261/3223* (2013.01); *C08G 2261/344* (2013.01); *C08G 2261/414* (2013.01); *C08G 2261/64* (2013.01); *C08G 2261/91* (2013.01); *C08G 2261/92* (2013.01); *C08G 2261/94* (2013.01)

(58) Field of Classification Search
CPC C08G 61/124; C08G 61/126; C08G 2261/12; C08G 2261/144; C08G 2261/148; C08G 2261/18; C08G 2261/3223; C08G 2261/344; C08G 2261/414; C08G 2261/64; C08G 2261/91; C08G 2261/92; C08G 2261/94
See application file for complete search history.

(56) References Cited

PUBLICATIONS

Mei, J. et al. Journal of the American Chemical Society vol. 133 pp. 20130-20133 published Nov. 2011.*
Craley, C.R. et al. Maromolecular Rapid Communications vol. 30 pp. 11-16 published Jan. 2009.*
Yuan, Yongbo, et al. "Ultra-high mobility transparent organic thin film transistors grown by an off-centre spin-coating method." Nature communications 5 (2014).
Yunbin Hu, et al., "Core-Expanded Naphthalene Diimides Fused with Sulfur Heterocycles and End-Capped with Electron-Withdrawing Groups for Air-Stable Solution-Processed n-Channel Organic Thin Film Transistors", Chem. Mater. 23, 1204-1215, (2011).
Zhou, Y.; Kurosawa, T.; Ma, W.; Guo, Y.; Fang, L.; Vandewal, K.; Diao, Y.; Wang, C.; Yan, Q.; Reinspach, J.; Mei, J.; Appleton, A. L.; Koleilat, G. I.; Gao, Y.; Mannsfeld, S. C. B.; Salleo, A.; Ade, H.; Zhao, D.; Bao, Z., "High Performance All-Polymer Solar Cell via Polymer Side-Chain Engineering", Advanced Materials 2014, Abstract Only.
Konishi, T.; TakenaoYoshizaki; Saito, T.; Einaga, Y.; Yamakawa, H., "Mean-square radius of gyration of oligo-and polystyrenes in dilute solutions", Macromolecules 1990, 23, 290-297. Abstract/1st Page Only.
Vacar, D.; Maniloff, E. S.; McBranch, D. W.; Heeger, A. J., Charge-transfer range for photoexcitations in conjugated polymer/fullerene bilayers and blends Phys. Rev. B 1997, 56, 4573-4577. Abstract Only.
Perahia, D.; Traiphol, R.; Bunz, U. H. F., "From single molecules to aggregates to gels in dilute solution: Self-organization of nanoscale rodlike molecules", J. Chem. Phys. 2002, 117, 1827-1832.
Babel, A.; Jenekhe, S. A., "Morphology and Field-Effect Mobility of Charge Carriers in Binary Blends of Poly(3-hexylthiophene) with Poly[2-methoxy-5-(2-ethylhexoxy)-1,4-phenylenevinylene] and Polystyrene" Macromolecules 2004, 37, 9835-9840. Abstract Only.
Nehls, B. S.; Asawapirom, U.; Fuldner, S.; Preis, E.; Farrell, T.; Scherf, U., "Semiconducting polymers via microwave-assisted Suzuki and Stille cross-coupling reactions", Adv. Funct. Mater. 2004, 14, 352-356.
Coakley, K. M.; McGehee, M. D., "Conjugated Polymer Photovoltaic Cells" Chem. Mater. 2004, 16, 4533-4542. Abstract Only.
Li, G.; Shrotriya, V.; Huang, J. S.; Yao, Y.; Moriarty, T.; Emery, K.; Yang, Y., "High-Efficiency Solution Processable Polymer Photovoltaic Cells by Self-Organization of Polymer Blends", Nature Mater. 2005, 4, 864-868.
Hua, Chi C., et al. "Viscometric investigation of aggregate formation in dilute conjugated polymer solutions." Journal of Rheology (1978-present) 49.3 (2005): 641-656.
Goffri, S.; Muller, C.; Stingelin-Stutzmann, N.; Breiby, D. W.; Radano, C. P.; Andreasen, J. W.; Thompson, R.; Janssen, R. A. J.; Nielsen, M. M.; Smith, P.; Sirringhaus, H., "Multicomponent semiconducting polymer systems with low crystallization-induced percolation threshold", Nature Mater. 2006, 5, 950-956. Abstract Only.
Günes, Serap, Helmut Neugebauer, and Niyazi Serdar Sariciftci. "Conjugated polymer-based organic solar cells." Chemical reviews 107.4 (2007): 1324-1338.
Kang, J.; Shin, N.; Jang, D. Y.; Prabhu, V. M.; Yoon, D. Y., "Structure and properties of small molecule-polymer blend semiconductors for organic thin film transistors", J. Am. Chem. Soc. 2008, 130, 12273-+.
Shaw, Paul E., Arvydas Ruseckas, and Ifor DW Samuel. "Exciton diffusion measurements in poly (3-hexylthiophene)." Advanced Materials 20.18 (2008): 3516-3520. Abstract Only.
Hau, Steven K., et al. "Air-stable inverted flexible polymer solar cells using zinc oxide nanoparticles as an electron selective layer." Applied Physics Letters 92.25 (2008): 253301.

(Continued)

*Primary Examiner* — Irina S Zemel
*Assistant Examiner* — Jeffrey Lenihan
(74) *Attorney, Agent, or Firm* — Crawford Maunu PLLC

(57) ABSTRACT

Various aspects of the present disclosure are directed to conjugated polymers, their manufacture and their implementations. As may be implemented in connection with one or more embodiments, an apparatus includes a conjugated polymer and a side chain or end chain material connected to the conjugated polymer. The amount and makeup of the side chain or end chain enhance solubility of the resulting modified conjugated polymer, relative to the conjugated polymer itself.

19 Claims, 11 Drawing Sheets

(56) References Cited

PUBLICATIONS

Hoth, C. N.; Schilinsky, P.; Choulis, S. A.; Brabec, C., "Printing Highly Efficient Organic Solar Cells", J. Nano Lett. 2008, 8, 2806-2813. Abstract Only.

Park, S. H.; Roy, A.; Beaupre, S.; Cho, S.; Coates, N.; Moon, J. S.; Moses, D.; Leclerc, M.; Lee, K.; Heeger, A. J. "Bulk heterojunction solar cells with internal quantum efficiency approaching 100%" Nature Photon. 2009, 3, 297-303. Abstract Only.

Kalowekamo, Joseph, and Erin Baker. "Estimating the manufacturing cost of purely organic solar cells." Solar Energy 83.8 (2009): 1224-1231.

Krebs, F. C.; Tromholt, T.; Jorgensen, M., "Upscaling of polymer solar cell fabrication using full roll-to-roll processing", Nanoscale 2010, 2, 873-886. Abstract Only.

Piliego, Claudia, et al. "Synthetic control of structural order in N-alkylthieno [3, 4-c] pyrrole-4, 6-dione-based polymers for efficient solar cells." Journal of the American Chemical Society 132.22 (2010): 7595-7597.

Chen, Daniel TN, et al. "Rheology of soft materials." Condensed Matter Physics 1 (2010).

Yu, B.-Y.; Lin, W.-C.; Wang, W.-B.; Iida, S.-i.; Chen, S.-Z.; Liu, C.-Y.; Kuo, C.-H.; Lee, S.-H.; Kao, W.-L.; Yen, G.-J.; You, Y.-W.; Liu, C.-P.; Jou, J.-H.; Shyue, J., "Effect of Fabrication Parameters on Three-Dimensional Nanostructures of Bulk Heterojunctions Imaged by High-Resolution Scanning ToF-SIMS", J. Acs Nano 2010, 4, 833-840. Abstract Only.

Mei, J. G.; Graham, K. R.; Stalder, R.; Reynolds, J. R., "Synthesis of Isoindigo-Based Oligothiophenes for Molecular Bulk Heterojunction Solar Cells", Org. Lett. 2010, 12, 660-663. Abstract Only.

Liang, Y.; Xu, Z.; Xia, J.; Tsai, S.-T.; Wu, Y.; Li, G.; Ray, C.; Yu, L., "For the bright future—bulk heterojunction polymer solar cells with power conversion efficiency of 7.4%." Adv. Mater. 2010, 22, E135-E138.

Zhou, H.; Yang, L.; Stuart, A. C.; Price, S. C.; Liu, S.; You, W., "Development of Fluorinated Benzothiadiazole as a Structural Unit for a Polymer Solar Cell of 7% Efficiency", Angew. Chem. Int. Ed. 2011, 50, 2995-2998. Abstract Only.

Yu, Xiang, et al. "High-performance field-effect transistors based on polystyrene-b-poly (3-hexylthiophene) diblock copolymers." ACS nano 5.5 (2011): 3559-3567.

Kamm, V., Battagliarin, G., Howard, I. A., Pisula, W., Mavrinskiy, A., Li, C., Müllen, K. and Laquai, F. (2011), Polythiophene:Perylene Diimide Solar Cells—the Impact of Alkyl-Substitution on the Photovoltaic Performance. Adv. Energy Mater., 1: 297-302. Abstract Only.

Lei, Ting, et al. "High-performance air-stable organic field-effect transistors: isoindigo-based conjugated polymers." Journal of the American Chemical Society 133.16 (2011): 6099-6101.Abstract Only.

Mei, Jianguo, et al. "Siloxane-terminated solubilizing side chains: bringing conjugated polymer backbones closer and boosting hole mobilities in thin-film transistors." Journal of the American Chemical Society 133.50 (2011): 20130-20133. Abstract Only.

Wang, E. G.; Ma, Z. F.; Zhang, Z.; Vandewal, K.; Henriksson, P.; Inganas, O.; Zhang, F. L.; Andersson, M. R., "An easily accessible isoindigo-based polymer for high-performance polymer solar cells", J. Am. Chem. Soc. 2011, 133, 14244-14247. Abstract Only.

Park, Jin Kuen, et al. "End-Capping Effect of a Narrow Bandgap Conjugated Polymer on Bulk Heterojunction Solar Cells." Advanced Materials 23.21 (2011): 2430-2435.

Sun, Yanming, et al. "Inverted Polymer Solar Cells Intergrated with a Low-Temperature—Annealed Sol-Gel-Derived ZnO Film as an Electron Transport Layer." Advanced Materials 23.14 (2011): 1679-1683.

Lipomi, Darren J., et al. "Stretchable organic solar cells." Advanced Materials 23.15 (2011): 1771-1775. Abstract Only.

Zhang, Zhi-Guo, et al. "Alkyl chain engineering on a dithieno [3, 2-b: 2', 3'-d] silole-alt-dithienylthiazolo [5, 4-d] thiazole copolymer toward high performance bulk heterojunction solar cells." Chemical Communications 47.33 (2011): 9474-9476. Abstract Only.

Mondal, Rajib, et al. "Side chain engineering of fused aromatic thienopyrazine based low band-gap polymers for enhanced charge carrier mobility." Journal of Materials Chemistry 21.5 (2011): 1537-1543. Abstract Only.

Fall, S.; Biniek, L.; Leclerc, N.; Léve; que, P.; Heiser, T., "Ambipolar charge transport in polymer: fullerene bulk heterojunctions for different polymer side-chains." Appl. Phy. Lett. 2012, 101, 123301.

Li, Sijun, et al. "Ternary donor-insulator-acceptor systems for polymer solar cells." Macromolecular rapid communications 33.21 (2012): 1882-1887.

Yiu, Alan T., et al. "Side-chain tunability of furan-containing low-band-gap polymers provides control of structural order in efficient solar cells." Journal of the American Chemical Society 134.4 (2012): 2180-2185. Abstract Only.

Ma, Zaifei, et al. "Synthesis and characterization of benzodithiophene-isoindigo polymers for solar cells." Journal of Materials Chemistry 22.5 (2012): 2306-2314.

Kim, Do Hwan, et al. "Comparison of the photovoltaic characteristics and nanostructure of fullerenes blended with conjugated polymers with siloxane-terminated and branched aliphatic side chains." Chemistry of Materials 25.3 (2013): 431-440. Abstract Only.

Lei, Ting, et al. "Systematic investigation of isoindigo-based polymeric field-effect transistors: design strategy and impact of polymer symmetry and backbone curvature." Chemistry of Materials 24.10 (2012): 1762-1770. Abstract Only.

Li, Gang, Rui Zhu, and Yang Yang. "Polymer solar cells." Nature Photonics 6.3 (2012): 153-161. Abstract Only.

Dou, Letian, et al. "Tandem polymer solar cells featuring a spectrally matched low-bandgap polymer." Nature Photonics 6.3 (2012): 180-185.

He, Zhicai, et al. "Enhanced power-conversion efficiency in polymer solar cells using an inverted device structure." Nature Photonics 6.9 (2012): 591-595.

You, Jingbi, et al. "A polymer tandem solar cell with 10.6% power conversion efficiency." Nature communications 4 (2013): 1446.

Li, Weiwei, et al. "Efficient tandem and triple-junction polymer solar cells." Journal of the American Chemical Society 135.15 (2013): 5529-5532.

Dou, Letian, et al. "Synthesis of 5 H-Dithieno [3, 2-b: 2', 3'-d] pyran as an Electron-Rich Building Block for Donor-Acceptor Type Low-Bandgap Polymers." Macromolecules 46.9 (2013): 3384-3390.

Mei, Jianguo, et al. "Integrated materials design of organic semiconductors for field-effect transistors." Journal of the American Chemical Society 135.18 (2013): 6724-6746. Abstract Only.

Cabanetos, Clément, et al. "Linear side chains in benzo [1, 2-b: 4, 5-b'] dithiophene-thieno [3, 4-c] pyrrole-4, 6-dione polymers direct self-assembly and solar cell performance." Journal of the American Chemical Society 135.12 (2013): 4656-4659. Abstract Only.

Mei, Jianguo, and Zhenan Bao. "Side chain engineering in solution-processable conjugated polymers." Chemistry of Materials 26.1 (2013): 604-615.

Yang, Xi, et al. "High-Efficiency Polymer Solar Cells Achieved by Doping Plasmonic Metallic Nanoparticles into Dual Charge Selecting Interfacial Layers to Enhance Light Trapping." Advanced Energy Materials 3.5 (2013): 666-673. Abstract Only.

Robb, Maxwell J., et al. "A One-Step Strategy for End-Functionalized Donor-Acceptor Conjugated Polymers." Macromolecules 46.16 (2013): 6431-6438. Abstract Only.

* cited by examiner

CONJUGATED POLYMER-BASED APPARATUSES, ARTICLES AND COMPOUNDS

FEDERALLY-SPONSORED RESEARCH AND DEVELOPMENT

This invention was made with Government support under contract DMR-1006989 awarded by the National Science Foundation. The Government has certain rights in this invention.

BACKGROUND

A variety of polymers are used in connection with various materials, and with many applications. In particular, organic polymers have been increasingly used in electrical applications, such as for providing electrode-type structures as may be used in applications such as solar cells, touch screens and sensors.

One type of application employing polymers in this regard pertains to organic bulk heterojunction (BHJ) solar cells, which can exhibit desirable mechanical properties, high-throughput manufacturing, and low processing costs. However, BHJ solar cells can be expensive and/or difficult to manufacture. For instance, obtaining desirable solubility and conductivity performance can be difficult, particularly as these aspects may be competing goals. These and other matters have presented challenges to the formation of articles and compounds in this regard, as well as to the implementation of such apparatuses, and related methods.

SUMMARY

Various example embodiments are directed to conjugated polymer-based materials and their implementation.

According to an example embodiment, an apparatus includes a conjugated polymer and another material attached to the conjugated polymer as a side chain or an end chain. The conjugated polymer operates with the other material at a molar ratio that provides a degree of solubility of the conjugated polymer as attached to the other material that is higher than a solubility of the conjugated polymer without the other material attached thereto.

Another example embodiment is directed to a method as follows. A conjugated polymer is attached to another material, the other material being attached as a side chain or an end chain. The conjugated polymer is used with the other material at a molar ratio that provides a degree of solubility of the conjugated polymer as attached to the other material that is higher than a solubility of the conjugated polymer without the other material attached thereto.

Another embodiment is directed to an organic photovoltaic apparatus having a semiconductor material and a collector that collects charge carriers from the semiconductor material. The semiconductor material includes a conjugated polymer a side chain and/or an end chain connected to the conjugated polymer. The semiconductor material exhibits a molar ratio that provides a degree of solubility of the conjugated polymer as attached to the side or end chain that is higher than a solubility of the conjugated polymer without the side or end chain attached thereto.

The above discussion/summary is not intended to describe each embodiment or every implementation of the present disclosure. The figures and detailed description that follow also exemplify various embodiments.

DESCRIPTION OF THE FIGURES

Various example embodiments may be more completely understood in consideration of the following detailed description in connection with the accompanying drawings shown in the Appendices that are part of the underlying provisional application, and in the attached figures, in which.

Figure 1:
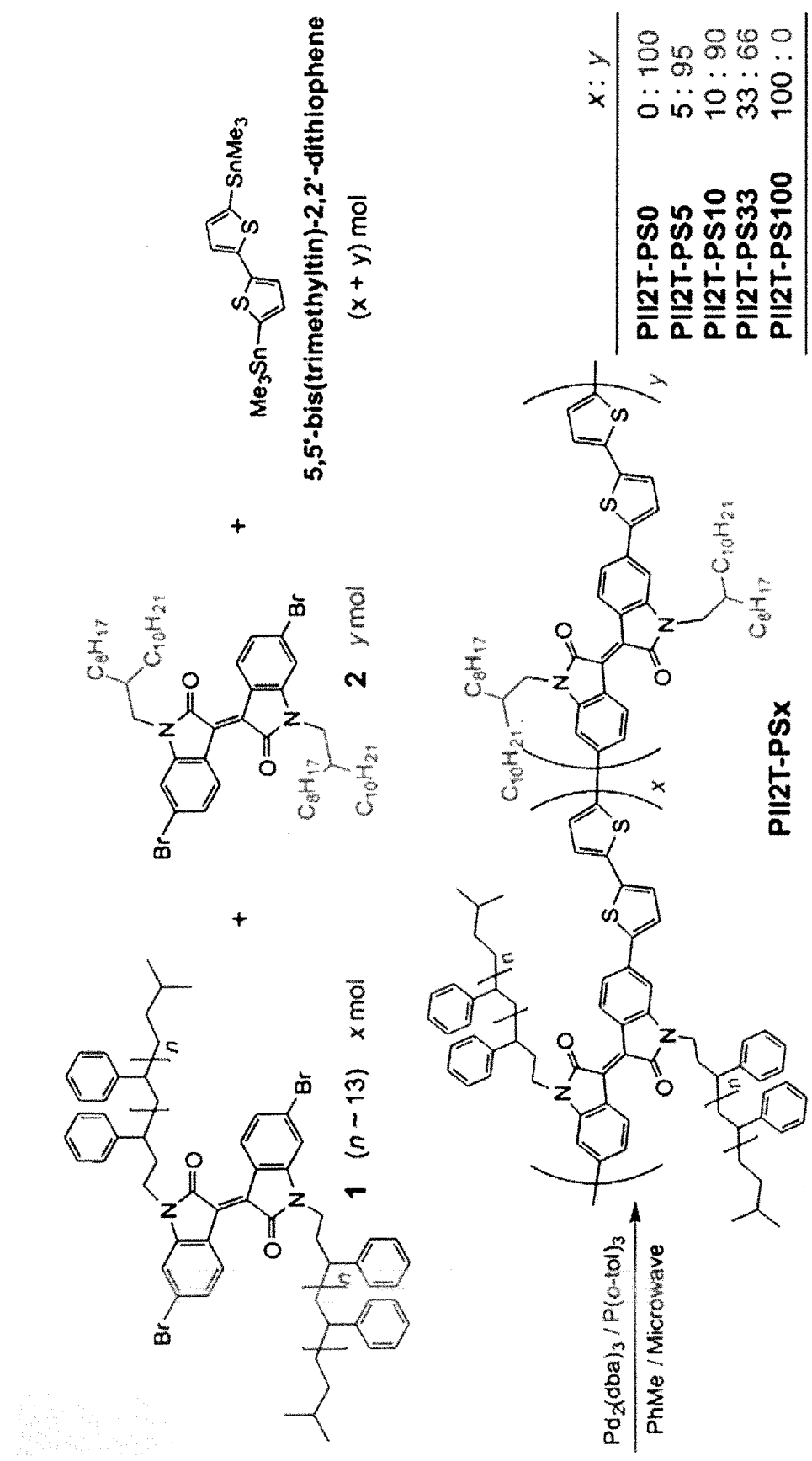
FIG. 1 shows several exemplary embodiments of polymers including side-chains, in accordance with aspects of the present disclosure.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods, including those involving the use of conjugated polymers having side and/or end chains, as may be connected to side chains for use as solar cells, field effect transistors, photovoltaic devices, and other devices. While not necessarily so limited, various aspects may be appreciated through a discussion of examples using this context.

Various embodiments of the present disclosure are directed to organic structures that possess high efficiency, high reproducibility and low-cost. Certain embodiments are directed to multi-component copolymerization in which polymers include a central backbone and side chains and/or end chains coupled thereto, addressing challenges as discussed above and as may encompass one or more of the aforementioned parameters. Solubility and conductivity can be tuned relative to one another, to achieve a desired tradeoff of such characteristics and/or others, as may be related to charge transport, absorptivity and transparency. This tuning may also facilitate lowering in viscosity, relative to a solution of the conjugated polymer. Such structures may be implemented with a variety of applications, such as photovoltaic systems, touch screens and others.

Various embodiments are described in Appendices A, B and C, which formed part of the provisional patent document and are incorporated herein by reference. Further, the various embodiments described herein, as well as in the underlying references provided in the Appendices, may be combined in varying degrees.

In accordance with another embodiment, an apparatus or method involves a conjugated polymer with another material attached thereto as a side chain or an end chain. The conjugated polymer and the other material have a molar ratio characterized to provide a balance or optimization of conductivity and a degree of solubility, in which the degree of solubility is higher with the other material attached to the conjugated polymer, relative to conjugated polymer without the other material attached to the conjugated polymer. Such an embodiment may, for example, be implemented with materials as shown in the figures, including those in the Appendices, and/or with embodiments as described in the Appendices.

The solubility and/or conductivity characteristic (e.g., as may relate to a photovoltaic characteristic), can be set with regard to the conjugated polymer and other material to achieve a tradeoff or optimization relative to desirable characteristics, such as for manufacturing and/or a resulting apparatus, as may involve a minimum specification for particular applications. In some embodiments, the degree of solubility is higher, relative to the conjugated polymer without the other material attached thereto, by a factor of at least 50%. The solubility facilitates implementation with a desired homogeneity of the material and a structure, such as a conductive sheet or an electrode. In certain embodiments, the conjugated polymer and other material have respective quantities and characteristics sufficient to avoid changes in conductivity of the conjugated polymer of greater than about 5%. A combination of such approaches is used in certain embodiments, in which the conjugated polymer and the other material are configured and arranged with respective quantities and characteristics sufficient to avoid changes in conductivity of the conjugated polymer of greater than about 5%, and a degree of solubility that is higher, relative to conjugated polymer without the other material attached to the conjugated polymer, by a factor of at least 50%. Further, such solubility and conductivity characteristics can be further tailored to meet particular transparency of a resulting structure, such as for solar cell, touch screen applications or other optoelectronic applications.

In various embodiments, a conjugated polymer material is implemented for printing or as a printable material. Solubility characteristics as described herein are used to facilitate printing (e.g., ink jet), while desirable electrical characteristics, such as conductivity or photovoltaic characteristics, are achieved.

Another embodiment is directed to an apparatus or method comprising or involving a conjugated polymer characterized as having a solubility and an electrical conductivity characteristic, and one or more side or end chains connected to the conjugated polymer. The conjugated polymer and one or more chains are cooperatively configured and arranged with a solubility that is greater than the solubility of the conjugated polymer, and an electrical conductivity characteristic that is equal to the electrical conductivity characteristic of the conjugated polymer. Such an embodiment may, for example, involve a conductivity characteristic that is of the conjugated polymer in one of an intrinsic state, as-doped, with a gate-field induced electrical characteristic, or a light-induced electrical characteristic.

In one or more embodiments, a size-based characteristic of a conjugated polymer/chain combination as described herein is controlled to facilitate solubility and electrical conductivity characteristics as described herein. In some implementations, a side or end chain is used with a conjugated polymer type to control a size of the chain or chains based upon a radius of gyration of the polymer while in solution and in a solid state. This approach may be used, for example, to facilitate desired properties as discussed herein.

The conjugated polymers as described herein may involve one or more of a variety of materials. In some embodiments, a conjugated polymer includes one of a poly(isoindigo-dithiophene) based polymer, diketopyrrolopyrrole-based polymer, naphthalene diimide-based polymer, and fused thiophene based polymer.

Similarly, the other material/side-chains or end-chain as described herein may be implemented with a variety of materials to suit particular embodiments. Various embodiments are directed to balancing the size, amount, and crystallinity of side-chains and/or end-chains in order to afford solution-processable materials, such as photovoltaic materials with optimized phase separation structure and/or optoelectronic performance. Such materials may include a monomer, an end-capping reagent, an oligomeric substituent, a polymeric substituent, or polystyrene (PS), and which may be coupled to the conjugated polymer via random copolymerization. Such polystyrene may, for example, exhibit a low polydispersity index (PDI) and controlled molecular weight, using one of a living radical and anion polymerization.

In some implementations, different chains are used, such as different side chains. In some embodiments, one side chain or group of side chains includes a short polymeric or oligomeric group, and another of the side chains includes at least one of a branched alkyl group, an oligoether, a fluoroalkyl chain, a swallow tail alkyl group or linear alkyl group. These materials are used in different combinations to suit different embodiments. Moreover, both side and end chains may be implemented, and in some such embodiments, the side and end chains have different molecular weights and/or different polarities. Further, the side chains and/or end chains may be coupled to the conjugated polymer using direct attachment and/or by growth from the conjugated polymer.

Certain embodiments are directed to a conjugated polymer and at least one chain that form a thin film having charge transport characteristics in which the at least one chain makes up about 3-35% of the molar content of the apparatus. Changes in the charge transport characteristics due to implementation of the chain are mitigated by selection of the chain and balance between solubility and electrical characteristics as described herein.

Figure 2:
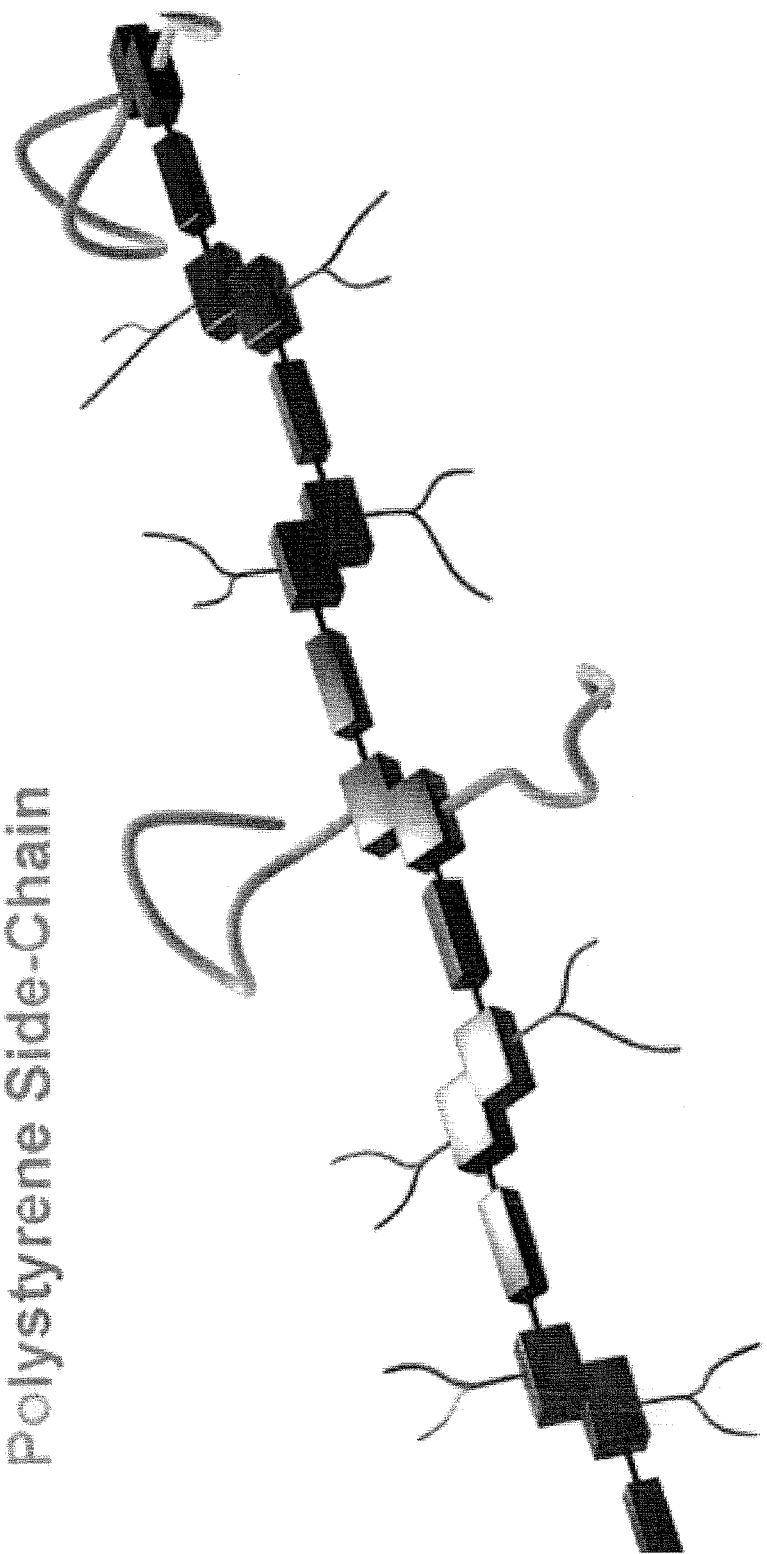
FIG. 2 shows a Poly(isoindigo-dithiophene) back-bone with polystyrene side-chain, in accordance with aspects of the present disclosure.
Figure 3A:
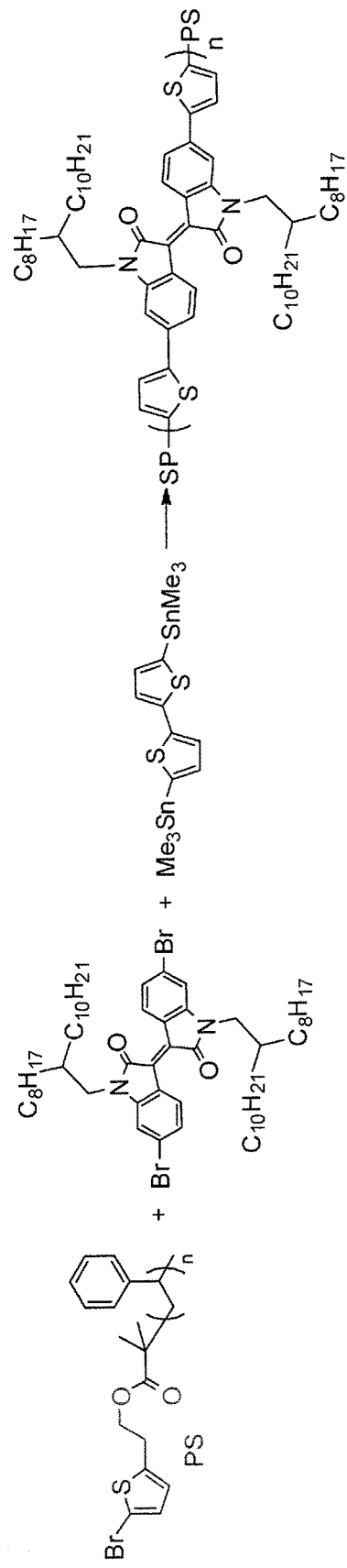
FIG. 3A shows an exemplary embodiment of a polymer having a back-bone and an end-chain, in accordance with aspects of the present disclosure.
Figure 3B:
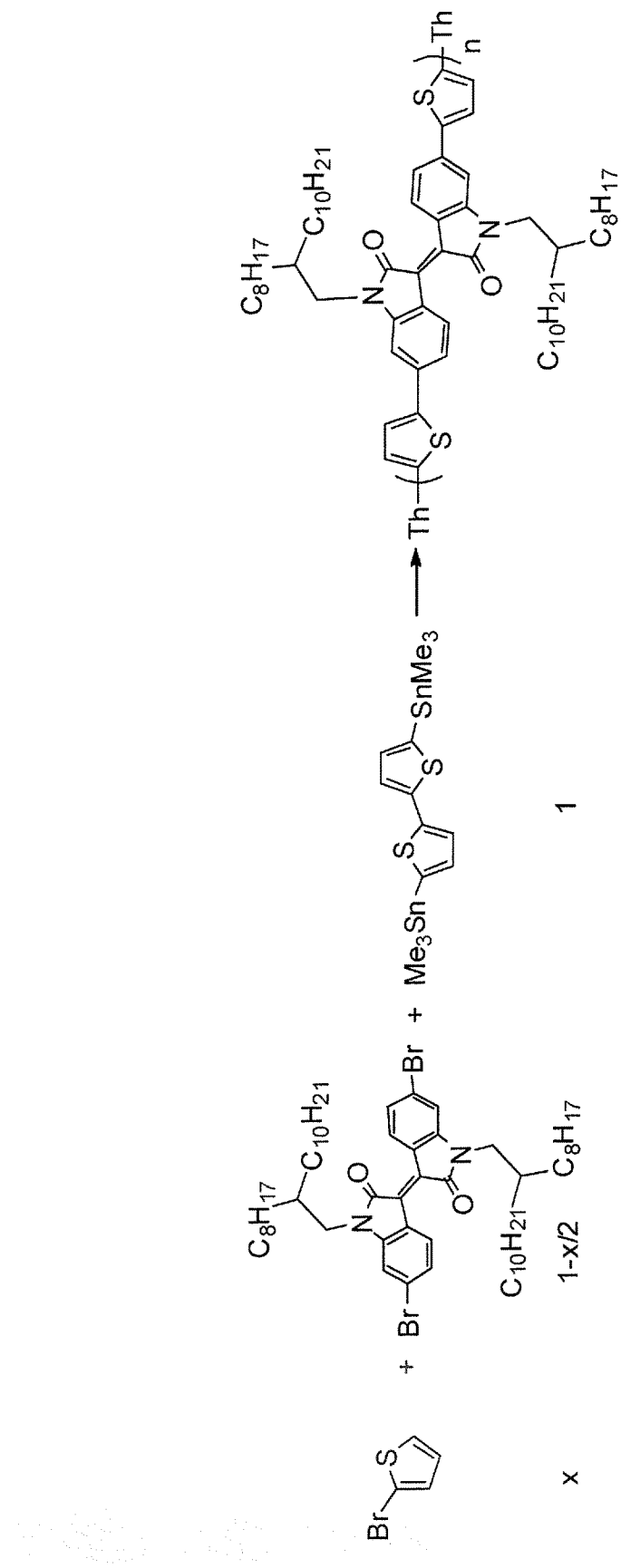
FIG. 3B shows an exemplary embodiment of a polymer having a back-bone and an end-chain, in accordance with aspects of the present disclosure.

Turning to the Figures, FIG. 1 shows several exemplary embodiments of polymers including side-chains, in accordance with aspects of the present disclosure. FIG. 2 shows a Poly(isoindigo-dithiophene) back-bone with polystyrene side-chain, in accordance with aspects of the present disclosure. FIGS. 3A and 3B show respective embodiments involving conjugated polymers having an end-chain, in accordance with aspects of the present disclosure.

In accordance with more particular embodiments, a series of poly(isoindigo-dithiophene) based conjugated polymers are synthesized with varying amounts of low molecular weight polystyrene side-chains (Mn=1,300 g/mol) via random copolymerization. The polystyrene side-chains can be used to facilitate desirable solubility, batch-to-batch reproducibility in terms of molecular weights, and thin film processing. Such approaches may be carried out with little effect upon electronic and optical properties, when the molar content of the polystyrene-containing repeating units are about 10% or less, of the copolymerized structure.

In various embodiments, bulk heterojunction solar cell devices are fabricated with polystyrene-containing copolymers, with desirable characteristics. For example, maximum power conversion efficiencies (PCE) of about 7% or higher, and open circuit voltages (VOC) of about 0.95 V or higher are demonstrated. This approach can be implemented to achieve a balance between optical/electronic properties and solubility/processability of reproducible polymeric systems, such as by trading off a modest change in conductivity with enhanced solubility.

Conjugated polymers as described herein can be used in various applications, to increase solubility without significant changes in conductive or semiconductive properties. In some embodiments, conjugated polymers are used to facilitate one or more of facile purification of organic semiconductors, processability for fabrication of opto-electronic devices such as transistors, solar cells and organic light emitting diodes. In certain embodiments, conjugated polymers as described herein are used to enhance electronic inks (e-ink) stability based on organic semiconductors. In such e-ink embodiments, the conjugated polymers reduce e-ink formulation complexity and stabilize a resulting product.

Various embodiments are directed to solar cells having a composition that is all or nearly all polymer-based. Phase separation domain size may be controlled to set device performance and operational characteristics. Donor polymers can be modified by attaching a small percentage of polystyrene side chains, which control phase separation behavior. The polymer side-chain can be utilized to reduce the domain size in a resulting blend film including the polymers by reducing the tendency for self-aggregation in the donor polymer. In a particular application, average PCE of a PiI-2T-PS5/P(TP) polymer, in which 5 mol % of the repeating units in PiI-2T are attached with polystyrene side chains, can reach 4.2% or 4.4%, with a $J_{SC}$ as high as 8.8 mA cm$^{-2}$ or 9.0 mA cm$^{-2}$, and a $V_{OC}$ of 1.04 V.

Figure 4A:
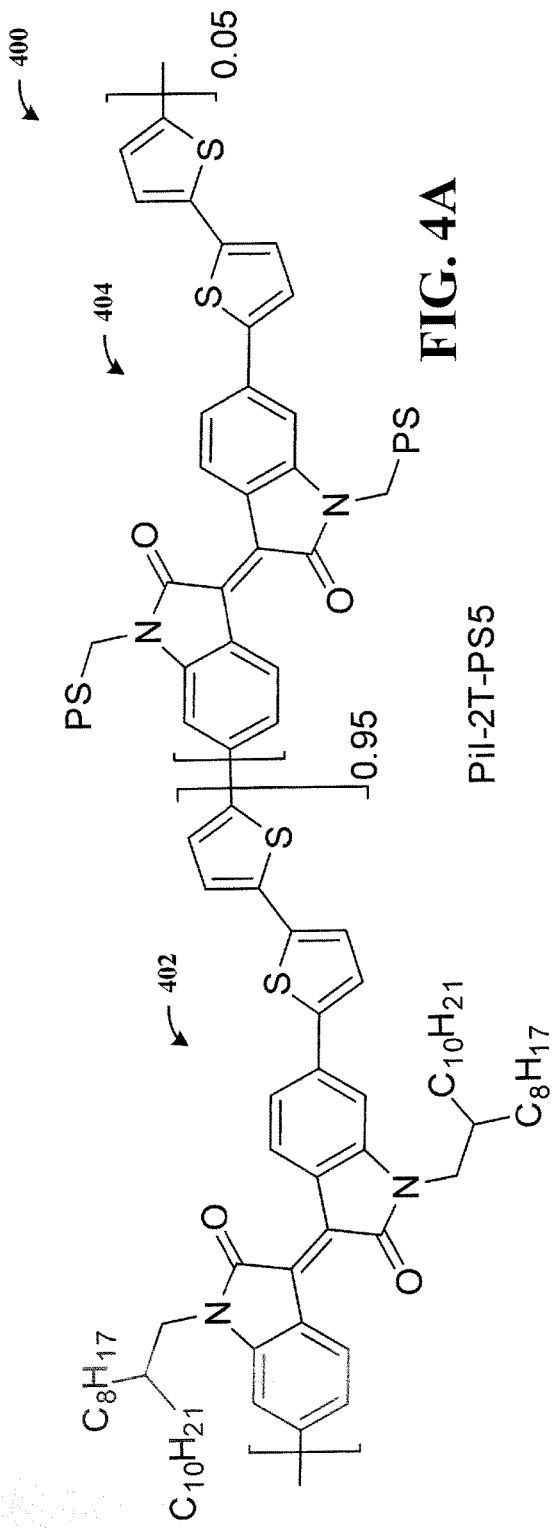
FIGS. 4A and 4B show example embodiments involving modified polymer donors, in accordance with aspects of the present disclosure.
Figure 4B:
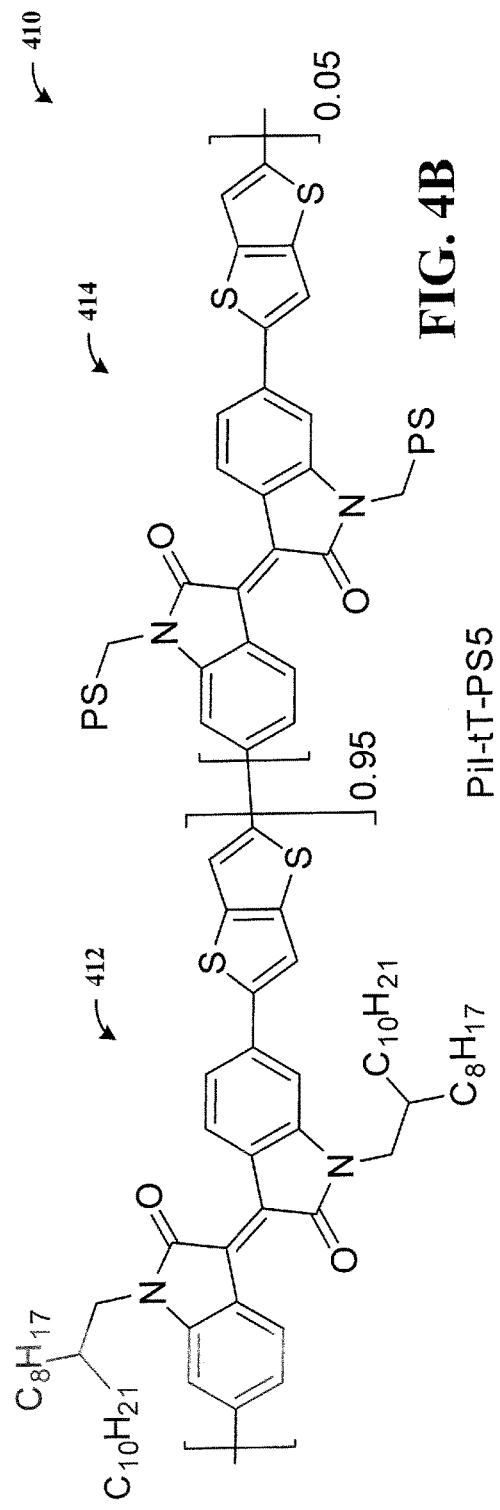

FIGS. 4A and 4B show example embodiments involving modified polymer donors. FIG. 4A shows a modified polymer donor 400 (PiI-2T-PS5) including a polymers 402 and 404, with the latter having a polystyrene side chain. FIG. 4B shows a modified polymer donor 410 (PiI-tT-PS5) including polymers 402 and 404, similarly modified.

Figure 5B:
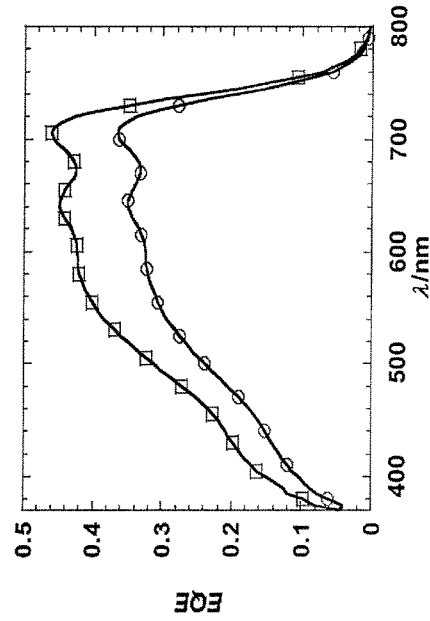
FIGS. 5A-5D show plots for modified polymers including PiI-2T/P(TP) and PiI-2T-PS5/P(TP), in accordance with one or more embodiments.
Figure 5D:
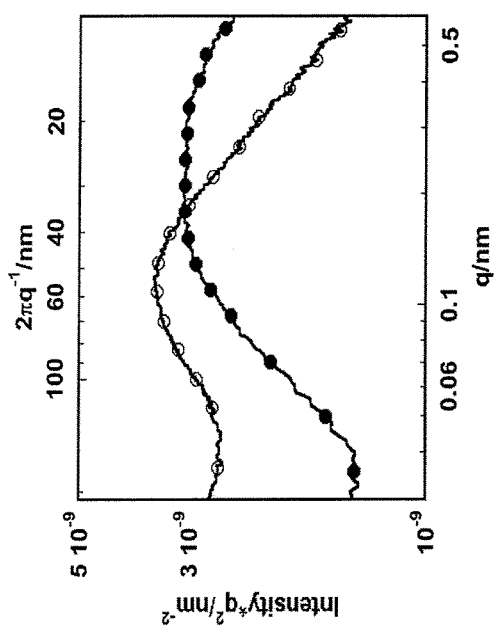
Figure 5A:
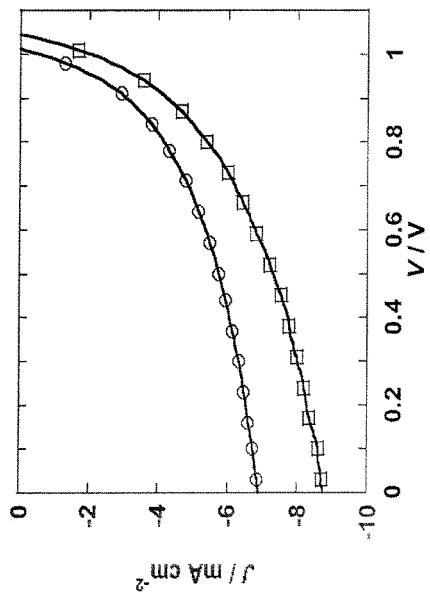
Figure 5C:
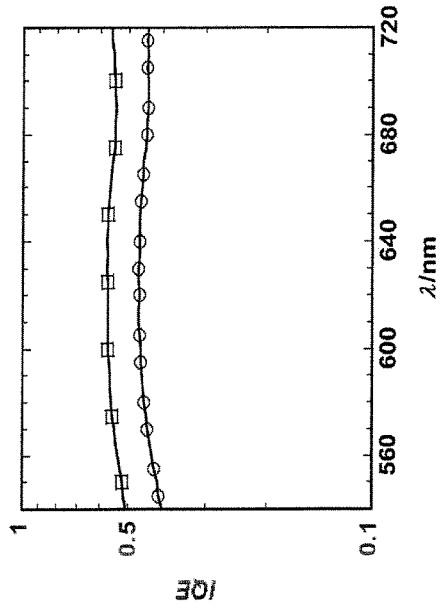

FIGS. 5A-5D show various plots for modified polymers for PiI-2T/P(TP) (circles) and PiI-2T-PS5/P(TP) (squares or filled circles), in accordance with one or more embodiments. FIG. 5A shows J-V curves, and FIG. 5B shows EQE spectra. FIG. 5C shows IQE spectra and RSoXS scattering features of solar cells, with FIG. 5D showing intensity. Consistent with FIG. 5C, the domain size (30 nm) of devices can be about 45% smaller than that formed by a PiI-2T/P(TP) blend (54 nm).

Figure 6A:
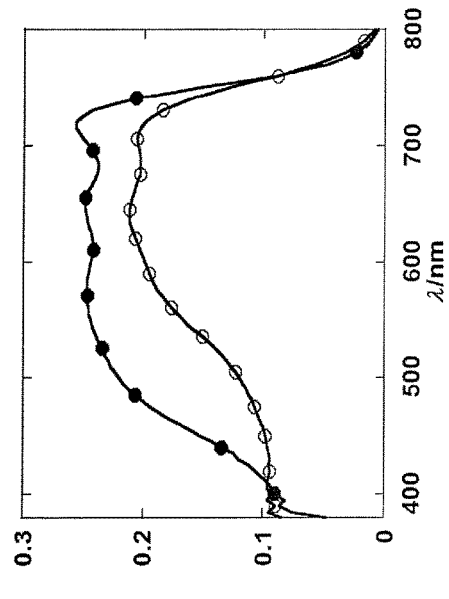
FIGS. 6A-6D show plots for modified polymers including PiI-tT/P(TP) and PiI-tT-PS5/P(TP), in accordance with one or more embodiments.
Figure 6B:
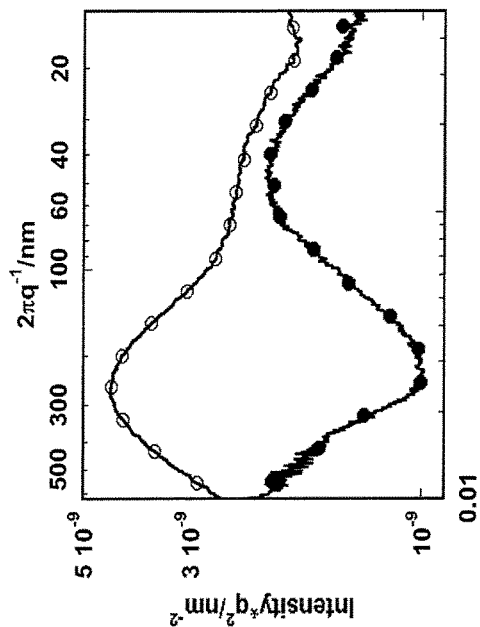
Figure 6C:
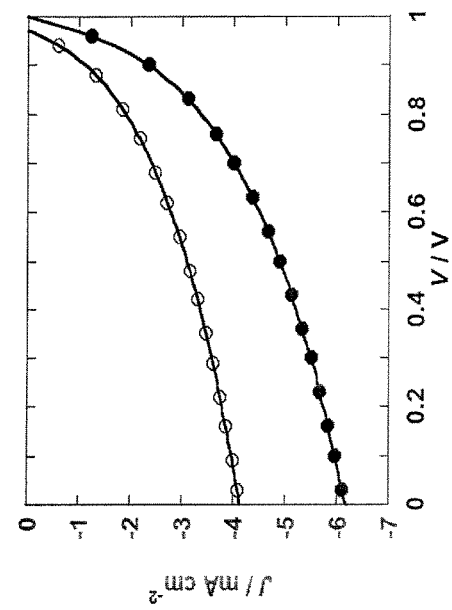
Figure 6D:
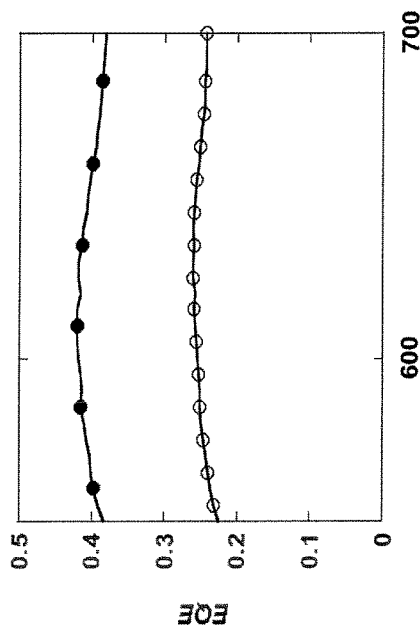

FIGS. 6A-6D also show various plots for modified polymers including PiI-tT/P(TP) (circles) and PiI-tT-PS5/P(TP) (filled circles), in accordance with one or more embodiments. FIG. 6A shows J-V curves and FIG. 6B shows EQE spectra. FIG. 6C shows IQE spectra and RSoXS scattering features of solar cells, with FIG. 6D showing intensity. In some experimental-type applications, after being modified by 5 mol % of a polystyrene side-chain, the PCE of PiI-tT-PS5/P(TP) increases to 2.75% from 1.67%, with a $J_{SC}$ as high as 5.92 mA cm$^{-2}$, and a $V_{OC}$ of 0.98 V. The phase separation length scale of the blend film, measured by RSoXS, is reduced from 260 nm to 50 nm by attaching 5% polystyrene side chains in the donor polymer. The PLQE is increased from 66% to 76% after the attachment of polystyrene side-chain, as related to a reduction of the domain length scale and an efficient exciton dissociation.

Different device fabrication conditions are utilized to optimize the device performance, consistent with the following recognition/discovery aspects. In some embodiments, annealing temperatures from 80 to 160° C. are applied to active films prior to the thermal evaporation of the electrodes. Similar J-V curves can be obtained indicating that phase separations of the polymers blends are stable under different thermal annealing condition. The PCEs of devices are not very sensitive to the donor/acceptor blend ratios from 5/4 to 4/5. These robust fabrication features can be implemented for large scale production, and can be implemented with donor-acceptor pairs despite a low LUMO-LUMO energy offset (e.g., of less than 0.1 eV). The phase separation domain length scale may correlate with the $J_{SC}$ and be sensitive to aromatic co-monomer structures used in crystalline donor polymers. With the polystyrene polymer side-chain engineering, the phase separation domain length scale can be decreased by more than 45%. The PCE and $J_{SC}$ of the devices can be increased by more than 20%. Accordingly, tuning polymer phase separation domain size can be used to achieve high performance, all-polymer solar cells. Polymer side-chain engineering can be implemented to provide an effective molecular engineering approach that may be combined with additional processing parameter control to further elevate the performance of all-polymer solar cells.

In some embodiments, two or more different side-chains are incorporated with a conjugated polymer. In some implementations, one of the side chains is a short polystyrene group and the other is a branched alkyl group, which are coupled with conjugated donor polymers by way of random copolymerization. The resulting conjugated polymer with side chains connected via polymerization benefits from good processability and photovoltaic performance.

A variety of different types of side and/or end chains are implemented, in connection with certain embodiments. For example, side and/or end chain materials with different molecular weights can be selected and implemented to achieve desirable solubility and conductivity characteristics, based upon the application and/or type of conjugated polymer implemented. For example, polymer side-chain or end-chains having a molecular weight of between about 1000 to 10000, such as the materials described herein, can be used in certain embodiments. Further, polymer side-chain and/or end-chains with different polarity are used to suit particular embodiments. For instance, a polarized side chain such as poly(methyl methacrylate) (PMMA) or polyacrylonitrile can be used, such as in place of polystyrene in embodiments herein.

Below, Table 1 depicts the solar cell performance of a number of side-chain copolymers, according to aspects of the present disclosure. Various embodiments, involving solar cells or other components, implement one or more of the copolymers as shown.

TABLE 1

Solar Cell Performance based on Side Chain Engineering

| Donor/PC$_{61}$BM (1/1.5) | PCE/% | Jsc/mA cm$^{-2}$ | V$_{OC}$/V | FF |
|---|---|---|---|---|
| PiI2T | 5.6 ± 0.2 | 11.5 ± 0.3 | 0.91 ± 0.01 | 0.54 ± 0.02 |
| PiI2T-PS2250 | 5.9 ± 0.1 | 11.8 ± 0.3 | 0.91 ± 0.005 | 0.55 ± 0.02 |
| PiI2T-PS4200 | −2.8 ± 0.2 | −8.2 ± 0.2 | 0.71 ± 0.07 | 0.48 ± 0.02 |
| PiI2T-PS4200M | −6.0 ± 0.05 | −11.9 ± 0.3 | 0.92 ± 0.005 | 0.55 ± 0.02 |
| PiI2T-PS5400 | −3.7 ± 0.2 | −9.4 ± 0.2 | 0.84 ± 0.02 | 0.46 ± 0.01 |
| PiI2T-PS5400M | −5.2 ± 0.2 | −10.3 ± 0.2 | 0.91 ± 0.01 | 0.56 ± 0.01 |
| PiI2T-PS6400CL | −2.2 ± 0.1 | −6.3 ± 0.3 | 0.78 ± 0.03 | 0.45 ± 0.04 |
| PiI2T-PS6400CB | −3.6 ± 0.2 | −9.3 ± 0.1 | 0.77 ± 0.03 | 0.50 ± 0.01 |
| PiI2T-Th4% | 4.7 ± 0.3 | 10.7 ± 0.3 | 0.88 ± 0.01 | 0.50 ± 0.03 |
| PiI2T-Th6% | 5.4 ± 0.1 | 10.5 ± 0.4 | 0.90 ± 0.004 | 0.58 ± 0.02 |
| PiI2T-Th8% | 4.2 ± 0.3 | 9.4 ± 0.2 | 0.87 ± 0.01 | 0.51 ± 0.04 |

In accordance with one or more embodiments, as may be implemented for experimental-type applications, atactic polystyrene is used to partially replace the branched alkyl group (2-octyl-dodecanyl) as a side-chain of a conjugated polymer backbone. The non-polar nature of polystyrene (with dipole moment=0.1 D) is used to avoid introducing additional charge traps into films such that the electronic performance degradation can be mitigated or avoided. Atactic polystyrene with M$_n$=1,300 g/mol (with a degree of polymerization ~12 and an estimated radius of gyration ~8.5 Å[31]) is used to provide a strong solubilizing effect because of its relatively large size (but not overly large that may significantly reduce the polymer/polymer electronic interactions) and random configurations of the tertiary carbon atoms along the polymer chain. Polystyrenes with low polydispersity index (PDI) and precisely controlled molecular weight can be obtained by either living radical or anion polymerization. The molecular weight of the polystyrene is well correlated to the radius of gyration of the polymer in solution and in solid state. In this regard, polystyrene is used as a way to control the bulkiness of the side-chains.

In a particular implementation, poly(isoindigo-dithiophene) is used as a backbone and functionalized, such as to provide (PII2T-PSx, x=0, 5, 10, 33 or 100). A dibromo functionalized isoindigo monomer 1 is provided, which is decorated with two atactic polystyrene side-chains (M$_n$=1300 g/mol, PDI=1.1, DP=12.5). Monomer 1 is copolymerized with another isoindigo dibromide monomer 2, bearing two 2-octyl-dodecanyl groups, together with 5,5'-bis(trimethyltin)-2,2'-dithiophene, to afford final polymer products. The stoichiometric ratio (x:y) between these two repeating units in the copolymers is determined by the molar ratio of the starting materials 1 and 2. This can be used to provide, by varying the ratio between 1 and 2, a series of copolymers with different molar percentages (0%, 5%, 10%, 33% and 100%) of the polystyrene-containing repeating units. In the NMR spectra of purified polymer products, the resonant peak intensity of the aromatic protons on polystyrene side-chains correlates well with the ratio of the polystyrene containing monomer 1. Thermogravimetric analysis (TGA) of PII2T-PS0~PS100 shows a significant weight loss at around 400° C., which can be attributed to the decomposition and vaporization of the side-chains.

In connection with various embodiments, it has been recognized/discovered that polystyrene side-chains can be implemented to modify polymers as discussed herein, without significantly interrupting solid-state packing modes, if the molar content of the polystyrene modified repeating units is about 10% or less. As such, reductions in charge transport properties the polymer films when modified can be limited. Accordingly, incorporation of polystyrene side-chains (10% molar ratio or less) with a polymer can be achieved with desirable solution solubility while maintaining (or nearly maintaining) charge carrier mobility and photo-absorptivity of corresponding thin films formed with the polymer.

Accordingly, incorporating tunable ratios of repeating units with short polystyrene side-chains into copolymers (e.g., via random copolymerization) can be implemented to achieve desirable processability while maintaining high charge transport and photovoltaic performance for conjugated copolymers. Further, synthetic batch-to-batch reproducibility (in terms of the molecular weight) can be improved via high solubility after the incorporation of polystyrene side-chains. Balanced solution-solution-processability and optimal device performance can be achieved by setting copolymer parameters such as solubility, processability, charge transport property and absorptivity, by tuning composition ratios. Moreover, the improved solubility can be used to purify polystyrene-containing copolymers by size exclusion chromatography, leading to high BHJ solar cell power conversion efficiency of 7%. These approaches are readily implemented with a multitude of conjugated polymeric systems, via setting/optimizing a side-chain ratio, as may be implemented for optoelectronic applications such as polymer solar cells and field effect transistors.

Figure 7:
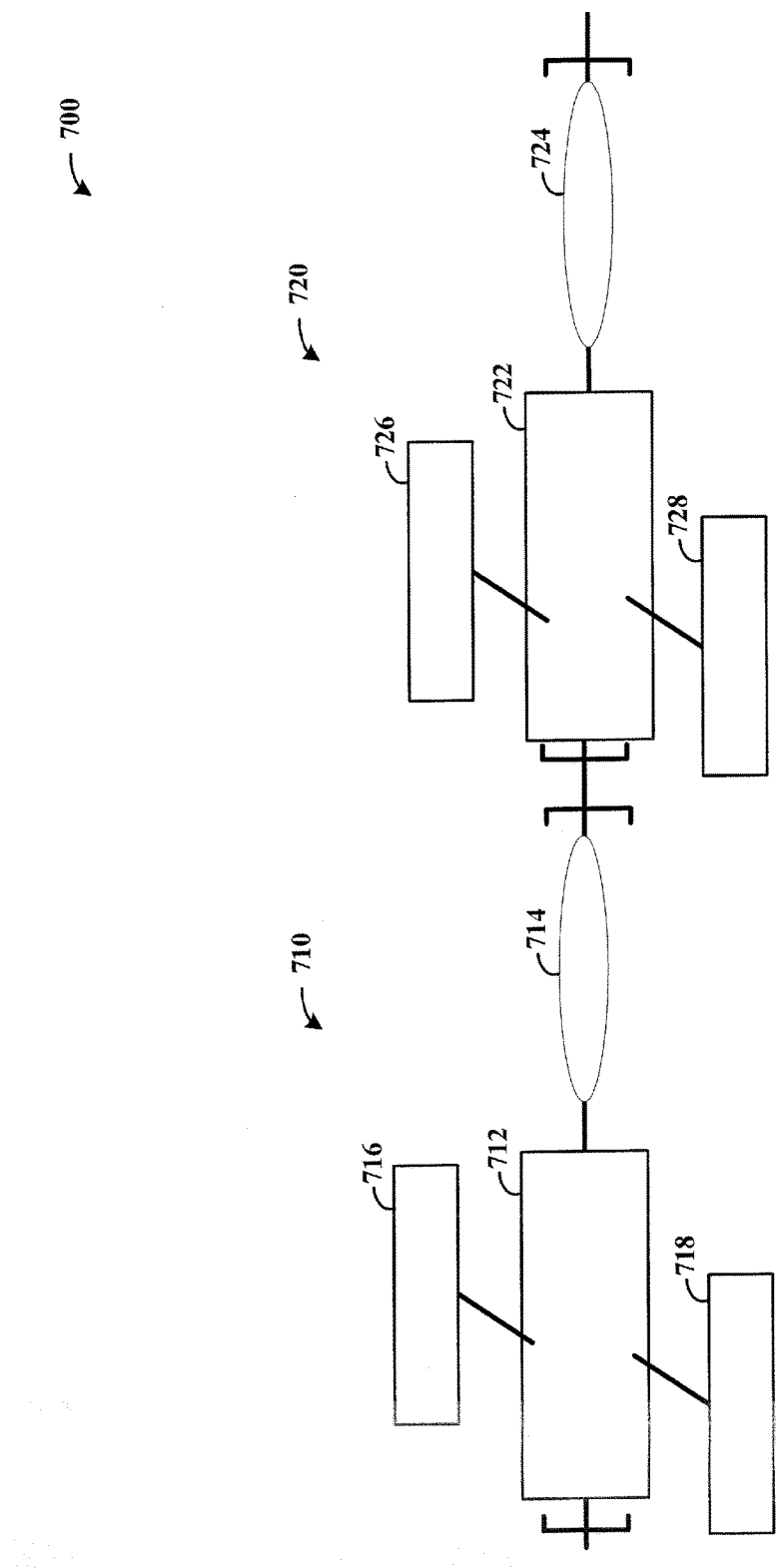
FIG. 7 shows a conjugated polymer having side chains, in accordance with another example embodiment.

FIG. 7 shows an embodiment including a conjugated polymer 700 having side chains, in accordance with another example embodiment. The conjugated polymer 700 includes two polymer building blocks 710 and 720, respectively having conjugated units 712/714 and 722/724, which may be implemented as common conjugated units or a combination of aromatic and fused aromatic units. Side chains 716 and 718 are coupled to unit 712, and side chains 726 and 728 are coupled to unit 722. The side chains may be linear or branched, may include additional side chains, and may be located on components between the conjugated units. For instance, the side chains may include a polymer side-chain such as polystyrene, poly(methyl methacrylate) or polyacrylonitrile.

Figure 8:
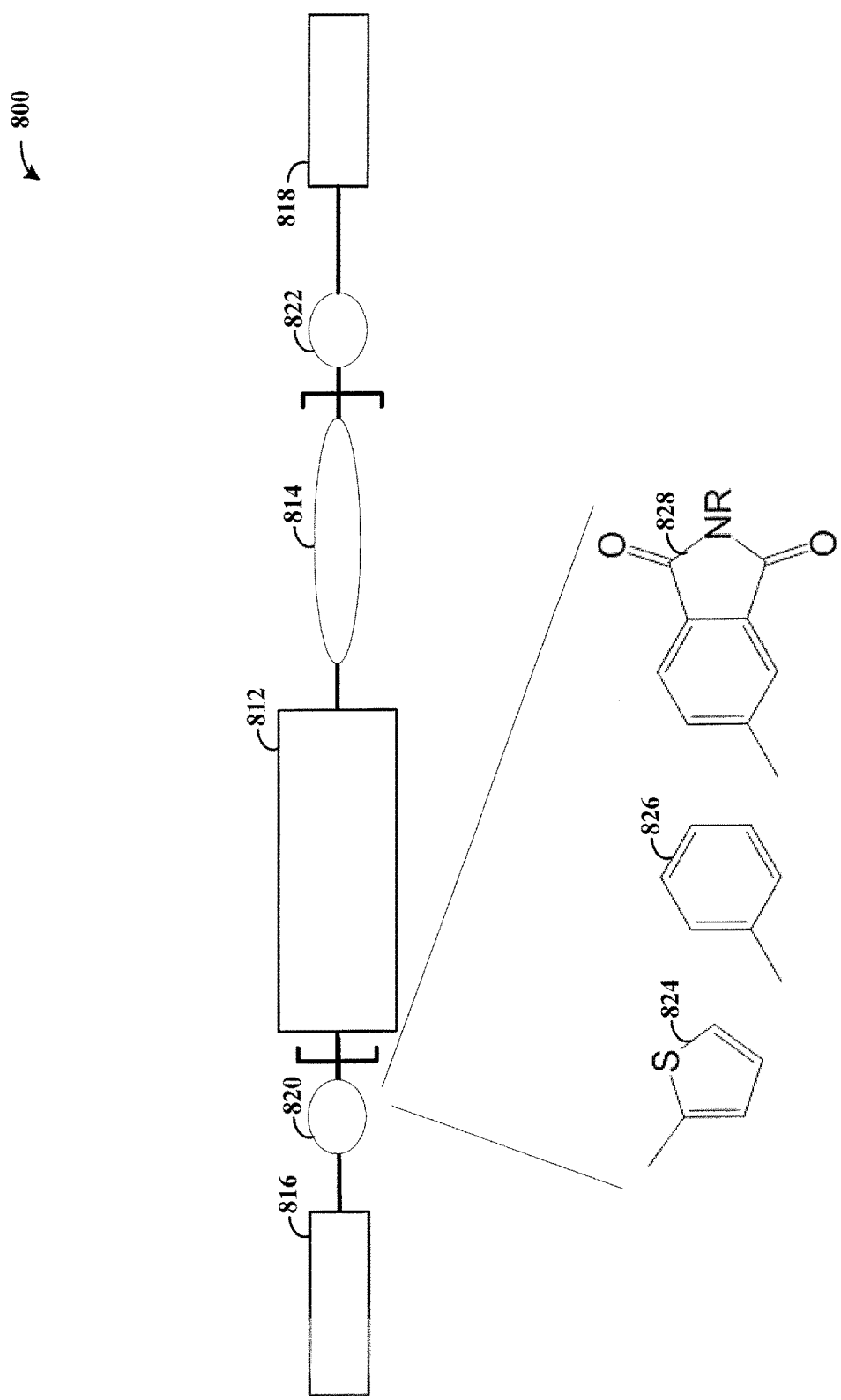
FIG. 8 shows a conjugated polymer having end chains, in accordance with another example embodiment.

FIG. 8 shows an embodiment including a conjugated polymer 800 having end chains, in accordance with another example embodiment. The polymer 800 includes conjugated units 812 and 814, which may be common or different, and may include a combination of aromatic and fused aromatic units. Components 820 and 822 are end-capping molecules, and end-chains 816 and 818 are coupled thereto. The end-capping molecules 820 and 822 may include one or more of molecules 824, 826 and 828 as shown. The end chains may include a variety of components such as discussed with FIG. 7, and may include two or more repeating units.

Figure 9:
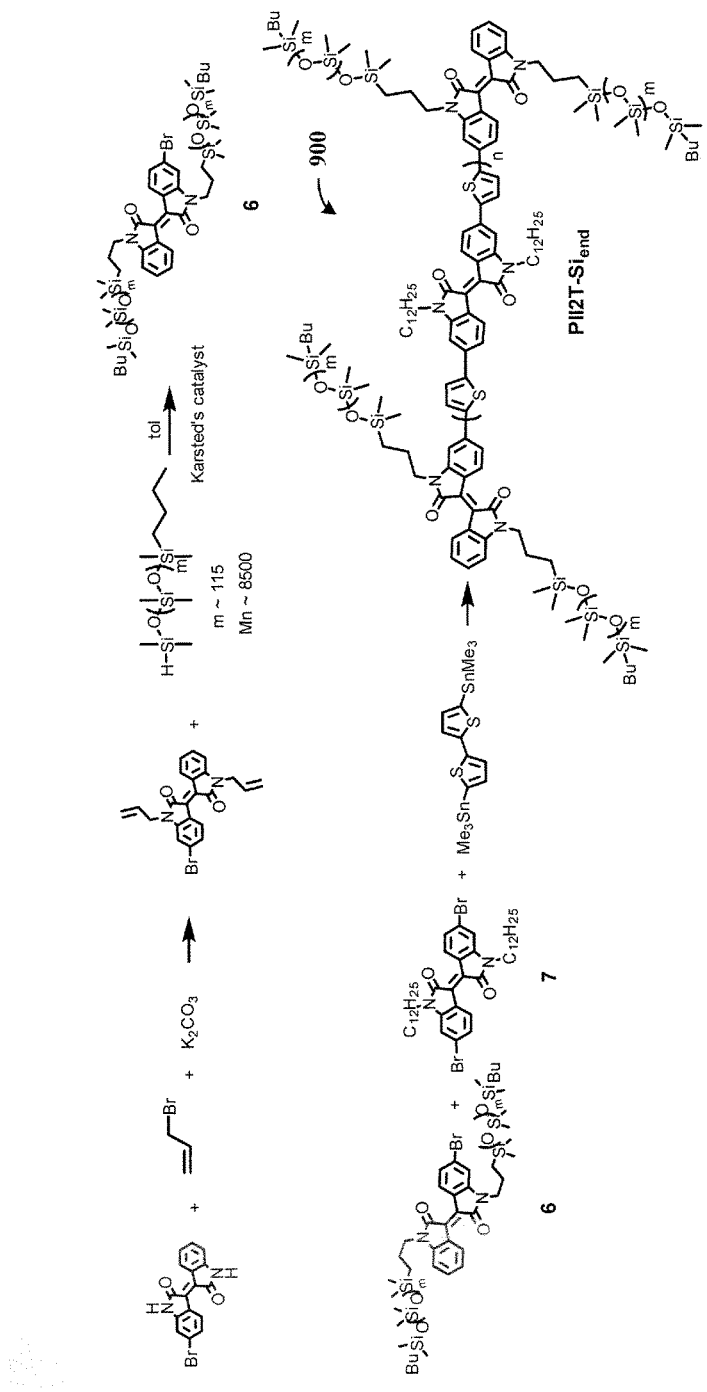
FIG. 9 shows materials and an approach to synthesizing siloxane end-capped isoindigo-based conjugated polymers, in accordance with another embodiment.

FIG. 9 shows materials and an approach to synthesizing siloxane end-capped isoindigo-based conjugated polymers, in accordance with another embodiment. The end-group 6 is prepared via N-alkylation and hydrosilylation, which has mono-functionalized bromo-isoindigo core attached by a siloxane polymer chain with repeat numbers of about 115. The component PII2T-Si$_{end}$ (900) is obtained using different ratios of end-capper and monomer 7. The monomer 7 includes an isoindigo core and a linear dodecyl chain. Different ratios of end-cap at the level of 2%, 4% and 6% may be incorporated into PII2T-Si$_{end}$, which can be used to render the polymers soluble in chloroform.

Figure 10:
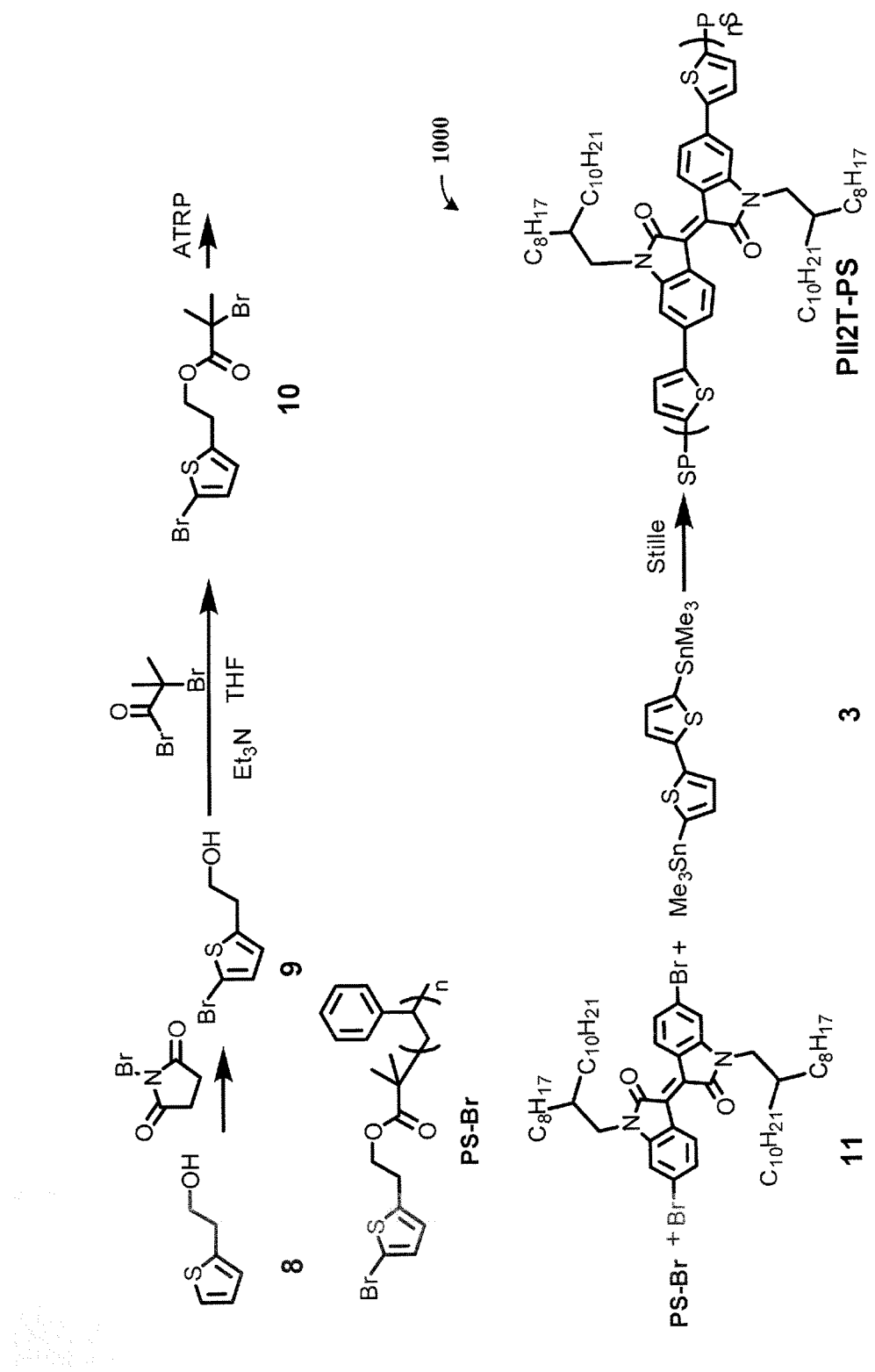
FIG. 10 shows materials and an approach for synthesis of polystyrene end-capped isoindigo-based conjugated polymers, in accordance with another example embodiment.

FIG. 10 shows materials and an approach for synthesis of polystyrene end-capped isoindigo-based conjugated polymers 1000, in accordance with another example embodiment. In some implementations, polystyrene end polymers are prepared by using atom transfer radical polymerization (ATRP). An ATRP imitator 10 is obtained from bromo-functionalized compound 9 and α-bromoisobutyryl bromide in the presence of triethylamine. The end-cap PS-Br is prepared via copper-catalyzed atom transfer radical polymerization in anisole. The molecular weight is controlled by the reaction retention time. In some implementations, fractions drawn from the reaction with number averaged molecular weights of 2250, 4200, 5400 and 6400 provide narrow polydispersities of ~1.1. PII2T-PS can be made by incorporation of different mole percentage of a PS-Br end-cap at the level of 0, 2, 4 and 6 mol %. The introduction of the end-cap can significantly improve the solubility of PII2T (e.g., which may otherwise be soluble in hot chlorobenzene but gel up at room temperature), which can thus be stable in solution for a prolonged time.

Based upon the above discussion and illustrations, those skilled in the art will readily recognize that various modifications and changes may be made to the various embodiments without strictly following the exemplary embodiments and applications illustrated and described herein. For example, the various molecules shown herein may be implemented in films or other structures, which may form part of one or more of a variety of electronic devices, including solar cells and others discussed herein. In addition, such copolymers described herein may be useful in a variety of fields, including such uses outside of semiconductor devices. Such modifications do not depart from the true spirit and scope of various aspects of the invention, including aspects set forth in the claims.

What is claimed is:

1. An apparatus comprising:
   a conjugated polymer; and
   another material attached to the conjugated polymer as a side chain or an end chain, the conjugated polymer being configured and arranged with the other material at a molar ratio that provides a degree of solubility in a solution of the conjugated polymer as attached to the other material that is higher than a solubility of the conjugated polymer in the solution without the other material attached thereto and mitigates changes in conductivity of the conjugated polymer, wherein the other material includes at least one of an oligomeric substituent, polymeric substituent, and polystyrene coupled to the conjugated polymer via random copolymerization.

2. The apparatus of claim 1, wherein the conjugated polymer is configured and arranged with the other material at a molar ratio and a miscibility that provide a homogeneous distribution of conductivity throughout a structure including the conjugated polymer and the other material.

3. The apparatus of claim 1, wherein the conjugated polymer is configured and arranged with the other material to mitigate changes in conductivity of the conjugated polymer of greater than about 5%.

4. The apparatus of claim 1, wherein the conjugated polymer is configured and arranged with the other material to provide a degree of solubility in the solution that is higher than a solubility of the conjugated polymer without the other material attached thereto in the solution, by a factor of at least 50%.

5. The apparatus of claim 1, wherein the conjugated polymer is configured and arranged with the other material to mitigate changes in conductivity of the conjugated polymer of greater than about 5%, and to provide a degree of solubility that is higher than a solubility of the conjugated polymer without the other material attached thereto, by a factor of at least 50%.

6. The apparatus of claim 1, wherein the degree of solubility of the conjugated polymer that is higher than the solubility of the conjugated polymer is twice the solubility of the conjugated polymer without the other material attached thereto.

7. The apparatus of claim 1, wherein the conjugated polymer and the other material are configured as printable material, and further including an optoelectronic structure including the conjugated polymer and the other material.

8. The apparatus of claim 7, wherein the apparatus further includes, and the optoelectronic structure forms a component of, at least one of: a solar cell collector, a photovoltaic electrode; an organic BHJ solar cell; a semi-conductive material configured and arranged to form part of a selectively-conductive switch or transistor; a polymer solar cell; and a field effect transistor.

9. The apparatus of claim 1, wherein the conjugated polymer is an isoindigo-based conjugated polymer, and wherein the other material includes one of a linear siloxane chain and a linear polystyrene end chain.

10. The apparatus of claim 1, wherein the conjugated polymer is an isoindigo-based conjugated polymer, and wherein the other material is a linear polystyrene end chain.

11. The apparatus of claim 1, wherein the conjugated polymer and the other material are configured and arranged to control a size of the side or end chain based upon a radius of gyration of the conjugated polymer while in solution and in a solid state.

12. The apparatus of claim 1, wherein
    the conjugated polymer includes one of a poly(isoindigo-dithiophene) based polymer, diketopyrrolopyrrole-based polymer, naphthalene diimide-based polymer, and fused thiophene based polymer.

13. The apparatus of claim 1, wherein the conjugated polymer and the side chain or end chain form a thin film having charge transport characteristics and in which the side chain or end chain makes up about 3-35% of the molar content of the apparatus, therein mitigating alteration of the charge transport characteristics upon coupling of the side chain or end chain and the conjugated polymer.

14. The apparatus of claim 1, wherein the conjugated polymer and the side chain or end chain are cooperatively configured and arranged with a viscosity in the solution that is less than a viscosity of the conjugated polymer in the solution, absent the side chain or end chain.

15. The apparatus of claim 1, wherein the other material includes both the side chain and the end chain, wherein the side chain includes a monomer and the end chain includes an end-capping reagent.

16. The apparatus of claim 1, wherein the conjugated polymer and the other material are configured and arranged to provide limit changes in electrical conductivity of the conjugated polymer within a tolerance of about 5%.

17. The apparatus of claim 1, further including polystyrene material attached to the conjugated polymer.

18. An organic photovoltaic apparatus comprising:
    a semiconductor material including a conjugated polymer and at least one of a side chain and an end chain connected to the conjugated polymer, and configured and arranged with a molar ratio that provides a degree of solubility in a solution of the conjugated polymer as attached to the side or end chain that is higher than a solubility in the solution of the conjugated polymer without the side or end chain attached thereto, and a collector configured and arranged to collect charge carriers from the semiconductor material.

19. An apparatus comprising:

a conjugated polymer; and another material attached to the conjugated polymer as a side chain or an end chain, the other material including at least one of an oligomeric substituent, polymeric substituent, and polystyrene coupled to the conjugated polymer via random copolymerization, and the conjugated polymer being configured and arranged with the other material:

at a molar ratio that provides a degree of solubility in a solution of the conjugated polymer as attached to the other material that is higher than a solubility in the solution of the conjugated polymer without the other material attached thereto;

at a molar ratio and a miscibility that provide a homogeneous distribution of conductivity throughout a structure including the conjugated polymer and the other material; and to mitigate changes in conductivity of the conjugated polymer of greater than about 5%, and to provide a degree of solubility that is higher than a solubility of the conjugated polymer without the other material attached thereto, by a factor of at least 50%.

* * * * *